United States Patent
Jeong et al.

(10) Patent No.: US 11,390,717 B2
(45) Date of Patent: Jul. 19, 2022

(54) COATING COMPOSITION

(71) Applicant: LG CHEM, LTD., Seoul (KR)

(72) Inventors: Hyeok Jeong, Seoul (KR); Cheol Hee Lee, Seoul (KR); Jin Kyu Lee, Seoul (KR)

(73) Assignee: LG Chem, Ltd., Seoul (KR)

(*) Notice: Subject to any disclaimer, the term of this patent is extended or adjusted under 35 U.S.C. 154(b) by 422 days.

(21) Appl. No.: 16/347,123

(22) PCT Filed: Oct. 30, 2017

(86) PCT No.: PCT/KR2017/012033
§ 371 (c)(1),
(2) Date: May 2, 2019

(87) PCT Pub. No.: WO2018/084504
PCT Pub. Date: May 11, 2018

(65) Prior Publication Data
US 2019/0276620 A1 Sep. 12, 2019

(30) Foreign Application Priority Data
Nov. 4, 2016 (KR) .................. 10-2016-0146684

(51) Int. Cl.
C08J 5/18 (2006.01)
C09D 4/06 (2006.01)
C09D 133/08 (2006.01)
C09D 133/06 (2006.01)
C08L 33/06 (2006.01)
C09D 7/40 (2018.01)
C09D 7/63 (2018.01)
G02F 1/1333 (2006.01)

(52) U.S. Cl.
CPC .............. *C08J 5/18* (2013.01); *C08L 33/06* (2013.01); *C09D 4/06* (2013.01); *C09D 7/40* (2018.01); *C09D 7/63* (2018.01); *C09D 133/06* (2013.01); *C09D 133/08* (2013.01); *G02F 1/1333* (2013.01)

(58) Field of Classification Search
CPC ... C08J 5/18; C08L 33/06; C09D 4/06; C09D 7/40; C09D 7/63; C09D 133/06; C09D 133/08; C08F 4/80; G02F 1/1333
See application file for complete search history.

(56) References Cited

U.S. PATENT DOCUMENTS

| 8,057,561 B2* | 11/2011 | White | C09G 1/02 51/298 |
|---|---|---|---|
| 8,853,350 B1* | 10/2014 | Anderson | C08G 59/685 528/407 |
| 9,375,965 B2 | 6/2016 | O'Rourke et al. | |
| 2005/0255325 A1 | 11/2005 | Inagaki | |
| 2008/0060277 A1* | 3/2008 | White | C09K 3/1445 51/298 |
| 2013/0085191 A1* | 4/2013 | Laskoski | A62D 3/30 521/53 |
| 2014/0147392 A1* | 5/2014 | O'Rourke | B41M 5/32 424/10.1 |
| 2015/0200091 A1* | 7/2015 | Chada | H01L 21/47 438/694 |
| 2016/0199267 A1* | 7/2016 | Miller | A61K 6/71 523/117 |
| 2017/0190963 A1* | 7/2017 | Miller | C09K 9/00 |
| 2017/0198215 A1* | 7/2017 | Miller | C09K 9/00 |
| 2019/0276620 A1* | 9/2019 | Jeong | C09D 133/06 |

FOREIGN PATENT DOCUMENTS

| CN | 103619970 A | 3/2014 |
|---|---|---|
| CN | 103958620 B | 5/2016 |
| JP | 06-200185 A | 7/1994 |
| JP | 07-1999527 A | 8/1995 |
| JP | 07-233365 A | 9/1995 |
| JP | 07-305000 A | 11/1995 |
| JP | 2006-212782 A | 8/2006 |
| JP | 2007-092073 A | 12/2007 |
| JP | 2008031147 A | 2/2008 |
| JP | 2010285480 A | 12/2010 |
| JP | 2012097245 A | 5/2012 |
| JP | 2013-0139556 A | 7/2013 |
| KR | 10-1999-0081314 A | 11/1999 |
| KR | 10-2006-0033697 A | 10/2007 |
| WO | 2011074515 A1 | 6/2011 |
| WO | 2013084847 A1 | 6/2013 |

* cited by examiner

Primary Examiner — Robert S Jones, Jr.
Assistant Examiner — Jiangtian Xu
(74) Attorney, Agent, or Firm — Dentons US LLP

(57) ABSTRACT

The coating composition of the present application has excellent antistatic properties and thus can be used as an antistatic hard coating film. The coating composition of the present application may comprise a salt based on a polyoxometalate anion and a radically polymerizable cation, and a radically polymerizable binder to form an antistatic hard coating film having excellent antistatic property, abrasion resistance and moist-heat resistance. Such a film can be used for an optical laminate and a display device, and the like.

12 Claims, No Drawings

COATING COMPOSITION

The present application is a National Stage entry of International Application No. PCT/KR2017/012033, filed Oct. 30, 2017, and claims priority to and the benefit of Korean Patent Application No. 10-2016-0146684, filed on Nov. 4, 2016, all of which are hereby incorporated by reference in their entirety for all purposes as if fully set forth herein.

TECHNICAL FIELD

The present application relates to a coating composition, a film, an optical laminate, and a display device.

BACKGROUND ART

A front panel used for a display panel or a liquid crystal display device, and the like causes a charging phenomenon on the surface. If foreign objects, such as surrounding dust, are attached to the charged surface, they cause malfunction or circuit damage in the device. Therefore, to solve the problem by the charging phenomenon, there is a method of forming an antistatic layer using an antistatic composition containing a conductive salt, but it has a disadvantage that a whitening phenomenon occurs by bleed out of the salt due to moisture in the air after coating.

Also, the above-described display panel, liquid crystal display device and the like are prone to deterioration in image quality due to scratches generated during use.

Accordingly, there is a demand for a composition capable of forming an antistatic layer having excellent abrasion resistance without causing the whitening phenomenon of antistatic components as well as having excellent antistatic performance.

DISCLOSURE

Technical Problem

The present application provides a coating composition, a film, an optical laminate and a display device.

Technical Solution

In the present application, the term alkyl group or alkoxy group may be an alkyl group or alkoxy group having 1 to 20 carbon atoms, 1 to 16 carbon atoms, 1 to 12 carbon atoms, 1 to 8 carbon atoms or 1 to 4 carbon atoms, unless otherwise specified. The alkyl group or alkoxy group may be linear, branched or cyclic, which may optionally be substituted with one or more substituents.

In the present application, the term alkenyl group or alkynyl group may be an alkenyl group or alkynyl group having 2 to 20 carbon atoms, 2 to 16 carbon atoms, 2 to 12 carbon atoms, 2 to 8 carbon atoms or 2 to 4 carbon atoms, unless otherwise specified. The alkenyl group or alkynyl group may be linear, branched or cyclic, which may optionally be substituted with one or more substituents.

In the present application, the term single bond means a case where there is no atom at the relevant site. For example, when Y is a single bond in a structure of X—Y—Z, X and Z are directly connected to form a structure of X-Z.

In the present application, the substituent which may optionally be substituted on the alkyl group and the like may be exemplified by halogen such as chlorine or fluorine, a haloalkyl group, an epoxy group such as a glycidyl group, a glycidylalkyl group, a glycidoxyalkyl group or an alicyclic epoxy group, an isocyanate group, a thiol group, an alkyl group or an alkoxy group, and the like, but is not limited thereto.

For example, the aforementioned alkyl group may be a haloalkyl group substituted with one or more halogen atoms.

The present application relates to a coating composition. The coating composition of the present application comprises a salt having a polyoxometalate anion.

In the present application, the polyoxometalate anion refers to a polyatomic ion in which three or more transition metal oxide ions are connected through an oxygen atom to form a closed three-dimensional skeleton. The polyoxometalate anions have different physical properties depending on the type of the contained transition metal and the type of the three-dimensional skeleton. The coating composition of the present application may comprise a salt having a polyoxometalate anion comprising molybdenum or tungsten.

The coating composition of the present application comprises a radically polymerizable binder, and a salt having a radically polymerizable cation and a polyoxometalate anion comprising molybdenum or tungsten.

In one example, the polyoxometalate anion may be an anion of a Lindqvist structure represented by Formula 1 below.

$$[(O)M_6O_{18}]^{2-} \quad \text{[Formula 1]}$$

In Formula 1, M is molybdenum or tungsten. Preferably, in Formula 1, M may be tungsten.

In one example, the polyoxometalate anion may be an anion of an α-Keggin structure represented by Formula 2 below.

$$[(XO_4)M_{12}O_{36}]^{q-} \quad \text{[Formula 2]}$$

In Formula 2, X is phosphorus, silicon or barium, M is molybdenum or tungsten, q is 3 when X is phosphorus, 4 when X is silicon, and 5 when X is barium. Preferably, in Formula 2, M may be tungsten and X may be silicon.

In one example, the polyoxometalate anion may be an anion of an α-Wells-Dawson structure represented by Formula 3 below.

$$[(XO_4)_2M_{18}O_{54}]^{6-} \quad \text{[Formula 3]}$$

In Formula 3, X is phosphorus and M is molybdenum or tungsten. Preferably, in Formula 3, M may be tungsten.

In one example, the polyoxometalate anion may be an anion of a Preyssler structure represented by Formula 4 below.

$$[(XO_4)_5M_{30}O_{90}]^{15-} \quad \text{[Formula 4]}$$

In Formula 4, X is phosphorus and M is molybdenum or tungsten. Preferably, in Formula 4, M may be tungsten.

In one example, the polyoxometalate anion may be an anion of an Anderson-Evans structure represented by Formula 5 below.

$$[Hy(XO_6)M_6O_{18}]^{n-} \quad \text{[Formula 5]}$$

In Formula 5, y is a number in a range of 0 to 6, n is a number in a range of 2 to 8, M is molybdenum or tungsten, and X is aluminum or tellurium. Preferably, in Formula 5, M may be tungsten.

By using a coating composition comprising a polyoxometalate anion having such a structure, it is possible to provide a coating composition capable of forming a film having excellent haze characteristics and abrasion resistance.

The salt of the present application may comprise a radically polymerizable cation together with the anion.

In the present application, the term radically polymerizable cation may mean a cation comprising one or more functional groups capable of participating in a cross-linking reaction, for example, a radical polymerization reaction. The polymerizable functional group may be exemplified by the aforementioned alkenyl group such as an allyl group or a vinyl group, an alkenyloxy group such as an allyloxy group or a vinyloxy group, an acryloyl group or a methacryloyl group, and the like, but is not limited thereto. For example, as described below, when the coating composition comprises a radically polymerizable binder as a binder, the radically polymerizable cations can participate in the polymerization reaction of the binder during formation of the coating layer to be fixed to the polymerized binder. In this case, since dissociation of the salt is performed more smoothly, excellent conductivity can be secured even by using a small amount of salt and the problem that the cations are bleeding in the formed coating layer and the transparency is lowered due to the whitening phenomenon can be solved.

Such a radically polymerizable cation can be represented by Formula 6 below.

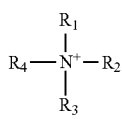

[Formula 6]

In Formula 6, $R_1$ to $R_4$ may be each independently hydrogen, an alkyl group, an alkoxy group or a radically polymerizable group. Here, the radically polymerizable group may be exemplified by an alkenyl group, an alkynyl group, an acryloyl group, a methacryloyl group, an acryloyloxy group, a methacryloyloxy group, an acryloyloxyalkyl group or a methacryloyloxyalkyl group, but is not limited thereto. Here, at least one of $R_1$ to $R_4$ may be the radically polymerizable group, for example, an alkenyl group, an acryloyl group, a methacryloyl group, an acryloyloxy group, a methacryloyloxy group, an acryloyloxyalkyl group or a methacryloyloxyalkyl group.

An example of the usable cation of Formula 6 as above in the present application may include a cation in which one or two of the $R_1$ to $R_4$ are each the radically polymerizable group and the remainder are each an alkyl group having 1 to 8 carbon atoms or 1 to 4 carbon atoms, and specifically, may be one or two or more of N-methacryloyloxymethyl-N,N,N-trimethylammonium, N-methacryloyloxyethyl-N,N,N-trimethylammonium, N-methacryloyloxypropyl-N,N,N-trimethylammonium, N-methacryloyloxybutyl-N,N,N-trimethylammonium, N-methacryloyloxymethyl-N-ethyl-N,N-dimethylammonium, N-methacryloyloxyethyl-N-ethyl-N,N-dimethylammonium, N-methacryloyloxypropyl-N-ethyl-N,N-dimethylammonium and the like, but is not limited thereto.

The ratio of the salt contained in the coating composition of the present application is not particularly limited. The ratio can be selected in consideration of, for example, desired surface resistance or hardness of the coating layer, and the like. In one example, the coating composition may comprise the salt in a ratio of 15 to 60 parts by weight relative to 100 parts by weight of the binder to be described below. In this specification, the unit part by weight means a weight ratio between components.

In one example, the salt may be included in an amount of 15 parts by weight or more, 20 parts by weight or more, or 25 parts by weight or more, relative to 100 parts by weight of the binder. The salt may be contained in an amount of 60 parts by weight or less, 45 parts by weight or less, or 35 parts by weight or less, relative to 100 parts by weight of the binder. Within such a range, the film formed with the coating composition can have a surface resistance of a value required for the antistatic film, and it is possible to obtain a coating composition capable of forming a film having low haze, excellent transparency and controlled whitening phenomenon.

The coating composition of the present application comprises a radically polymerizable binder.

In the present application, the term radically polymerizable binder may mean a binder containing one or more polymerizable functional groups capable of participating in a cross-linking reaction, for example, a radical polymerization reaction. An example of the polymerizable functional group is the same as that described in the radically polymerizable cation.

As the binder, various materials may be used as long as they contain at least one functional group as above, and for example, an acrylate compound may be used. The acrylate compound is a compound containing at least one of the above-mentioned acryloyl group, methacryloyl group, acryloyloxy group, methacryloyloxy group, acryloyloxyalkyl group or methacryloyloxyalkyl group.

In one example, a multifunctional acrylate compound may be used as the binder in terms of ensuring adequate curing rate and low shrinkage and abrasion resistance. The multifunctional acrylate is an acrylate compound containing two or more of the acryloyl group, methacryloyl group, acryloyloxy group, methacryloyloxy group, acryloyloxyalkyl group or methacryloyloxyalkyl group. For example, the acrylate compound may be trifunctional or higher. The upper limit of the number of acryloyl groups and the like contained in the acrylate compound is not particularly limited, but is generally 8 or less. Accordingly, the acrylate compound may be a trifunctional to octafunctional acrylate compound.

The specific kind of such a multifunctional acrylate compound is not particularly limited.

As the multifunctional acrylate, for example, a difunctional acryate such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecanedimethanol(meth)acrylate, dimethyloldicyclopentane di(meth)acrylate, ethylene oxide modified hexahydrophthalic acid di(meth)acrylate, tricyclodecanedimethanol (meth)acrylate, neopentyl glycol modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; a tetrafunctional acrylate such as diglycerin tetra(meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa(meth)acrylate, caprolactone modified dipentaerythritol hexa(meth)acrylate or urethane (meth) acrylate (ex. a reactant of isocyanate monomer and trimethylolpropane tri(meth)acrylate), and the like can be used. Also, the multifunctional acrylate is a compound referred to as a so-called photo-curable oligomer in the industry, where urethane acrylate, epoxy acrylate, polyester acrylate or polyether acrylate, and the like may also be used. Among these compounds, one or two or more suitable types may be selected and used.

In addition, the coating composition of the present application may further comprise a radical initiator for inducing polymerization reaction of the binder or the like. As the radical initiator, a thermal radical initiator that initiates a radical reaction by heat application or a photo radical initiator that initiates a radical reaction by light and the like may be applied, and generally, the photo radical initiator is used, but the kind of the initiator is not limited thereto.

As such an initiator, generally, a benzoin-based initiator such as benzoin, benzoin methyl ether, benzoin ethyl ether, benzoin isopropyl ether, benzoin n-butyl ether or benzoin isobutyl ether or a ketone-based initiator such as acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholino-propan-1-one, 4-(2-hydroxyethoxy)phenyl-2-(hydroxyl-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal or oligo[2-hydroxy-2-methyl-1-[4-(1-methylvinyl)phenyl]propanone], and the like is used, but the usable initiator in the present application is not limited thereto.

The initiator may be included in the coating composition in a ratio of 0.1 to 10 parts by weight relative to 100 parts by weight of the binder. Within such a range, a sufficient polymerization reaction can be efficiently induced by heat application or light irradiation, and the phenomenon in which the unreacted initiator after the polymerization remains as an impurity, so that a cross-linking density is lowered or mechanical properties of the coating layer are deteriorated, or the phenomenon of increasing reflectance can be prevented.

The coating composition of the present application may further comprise an organic solvent. When the organic solvent is added, the constitution is no limitation, but considering proper viscosity securement of the coating composition and strength of the finally formed film, and the like, it can be used in an amount of 50 to 500 parts by weight, 100 to 400 parts by weight or 150 to 350 parts by weight relative to 100 parts by weight of the binder.

At this time, the type of the usable organic solvent is not limited on its constitution, but one or a mixture of one or more selected from the group consisting of lower alcohols having 1 to 6 carbon atoms, acetates, ketones, cellosolves, dimethylformamide, tetrahydrofuran, propylene glycol monomethyl ether, toluene and xylene can be used.

At this time, the lower alcohol may be exemplified by methanol, ethanol, isopropyl alcohol, butyl alcohol, isobutyl alcohol or diacetone alcohol, and the like, but the present application is not limited to the above-described examples. And, as the acetate, methyl acetate, ethyl acetate, isopropyl acetate, butyl acetate or cellosolve acetate can be utilized, and as the ketone, methyl ethyl ketone, methyl isobutyl ketone, acetyl acetone or acetone can be utilized, but the present application is not limited to the above-described examples.

Besides, the antistatic coating composition according to the additionally aforementioned embodiment may further comprise one or more additives selected from the group consisting of a leveling agent, a wetting agent, a defoaming agent and silica having a volume average particle diameter of 1 to 50 nm. At this time, the additive may be added in an amount of 0.01 to 10 parts by weight relative to 100 parts by weight of the binder.

The leveling agent serves to uniformize the surface of the coating film coated using an antistatic coating composition. In addition, as the wetting agent serves to lower the surface energy of the antistatic coating composition, it helps to achieve a uniform application when coating the antistatic coating composition on a transparent base material layer.

At this time, the defoaming agent may be added to remove bubbles in the antistatic coating composition. And, the silica is added as inorganic particles, and thus serves to improve scratch resistance and film strength in the coating film. When silica having a volume average particle diameter of 1 to 50 nm is used, a transparent coating film can be secured, and preferably, it does not influence optical properties of the coating film.

Furthermore, the coating composition of the present application may further comprise a fluorine-based silane, and specifically, tridecafluorooctyltriethoxysilane, heptadecafluorodecyltrimethoxysilane or heptadecafluorodecyltriisopropoxysilane may be used, where one of such a fluorine-based silane or a mixture of two or more different silanes may be used, without being limited to the aforementioned examples.

The present application also relates to a film comprising a coating layer formed using the coating composition. Thus, the coating layer in the film of the present application may comprise the radically polymerizable binder; the radically polymerizable cations and the anions. In such a coating layer, the cations and the anions of the salt may be in a state where they form ionic bonds with each other, or may be in a state of dissociation. Also, the binder may form a polymeric material by radical polymerization. Furthermore, the radically polymerizable cations may also be polymerized with each other to form a polymeric material, or may be polymerized together with the binder.

In the film of the present application, since details for the radically polymerizable binder, the radically polymerizable cation and the polyoxometalate anion comprising molybdenum or tungsten are the same as those described in the above-mentioned coating composition, they will be omitted.

Therefore, a polymeric substance of the radically polymerizable binder; a polymeric substance of the radically polymerizable cations and/or a polymeric substance of the binder and the cations may be included. Accordingly, as described above, the desired surface resistance can be secured even by using a small amount of salt, and the bleed out of the salt components or the whitening phenomenon, and the like can be prevented.

The film of the present application can be produced by forming the coating layer on a suitable transparent base material layer. At this time, the method of forming the film using the coating composition on the transparent base material layer is not limited on its constitution, but may proceed by using a wet coating method such as a roll coating method, a bar coating method, a spray coating method, a dip coating method or a spin coating method. For example, the coating layer may be formed by coating the coating composition in the same manner as described above and polymerizing the coated layer through appropriate heat application or light irradiation.

The material of the transparent base material layer is not particularly limited on its constitution, and any material conventionally used in the technical field for the production of an antistatic hard coating film may be used. Specifically, it may be one or more selected from the group consisting of triacetyl cellulose (TAC), polyethylene terephthalate (PET), polyethylene naphthalate (PEN), polycarbonate (PC) and a norbornene-based polymer, but is not limited to the aforementioned examples. The transparent base material layer preferably has a transmittance of at least 85%. Also, the haze value may be 1% or less and the thickness may be 30 to 120 μm, but the present application is not limited to the haze value and thickness of the base material layer as described above.

The film thus formed has excellent surface resistance characteristics and has such a property that no dust or dirt adheres to the surface. The surface resistance of the film may be $1 \times 10^8$ to $9 \times 10^{10} \Omega/\square$. In one example, the lower limit of the surface resistance of the film may be $1 \times 10^8 \Omega/\square$ or more, $5 \times 10^8 \Omega/\square$ or more, or $1 \times 10^9 \Omega/\square$ or more. In one example, the upper limit of the surface resistance of the film may be $9 \times 10^{10} \Omega/\square$ or less, $5 \times 10^{10} \Omega/\square$ or less, or $1 \times 10^{10} \Omega/\square$ or less. When the whitening phenomenon of salts which are antistatic occurs, the surface resistance values measured on the surface of the whitened film appear unevenly with a large deviation according to the measured position, which may be measured as $1 \times 10^8 \Omega/\square$ or less, $1 \times 10^7 \Omega/\square$ or less, or $1 \times 10^6 \Omega/\square$ or less depending on the measured position. As the film of the present application has the surface resistance as above in the entire area by causing no whitening phenomenon of the salt as above, it may have excellent antistatic properties, thereby preventing dust and dirt from adhering to the surface of the film, and when it is applied to a display device, it is possible to prevent deterioration of image quality or malfunction of the device due to generation of static electricity.

The film of the present application has a transmittance of 90% or more, 91% or more, or 92% or more, and has a haze of 1% or less, 0.5% or less or 0.3% or less, as measured according to the same standard. The film of the present application may be formed from the aforementioned coating composition to have excellent optical performance.

The present application also relates to an optical laminate comprising the film. An exemplary optical laminate may comprise an optical film and a film layer of the present application formed on one or both sides of the optical film. Here, as the optical film, a polarizing film, a retardation film or a luminance enhancement film, and the like, or a laminate in which two or more of the foregoing are laminated can be exemplified.

The present application also relates to a display device comprising the optical laminate. An exemplary display device may be a high resolution flat panel display or a mobile display, and specifically, may be a liquid crystal display (LCD), a plasma display panel (PDP), or the like, but is not limited thereto.

Advantageous Effects

The coating composition of the present application can form a coating layer having excellent antistatic properties and having excellent abrasion resistance and moist-heat resistance.

MODE FOR INVENTION

Hereinafter, the coating compositions or the like of the present application will be specifically described through Examples and Comparative Examples, but the scope of the coating compositions or the like is not limited to the following Examples.

1. Transmittance and Haze Analyses

Transmittance and haze analyses were carried out using HR-100 from Murakami Color Research Laboratory.

2. Abrasion Resistance Test

A coating film was rubbed with a steel wool (#0000), to which a load of 0.5 kg was applied, 10 times, and then appearance of scratches was observed.

◎: number of scratches 0

O: five or less thin scratches of 1 cm or less

Δ: more than 5 thin scratches of 1 cm or less, or 1 or more to 3 or less of long scratches of 1 cm or more X: more than 3 long scratches of 1 cm or more 3. Moist-Heat Resistant Test After a film is left at a temperature of 60° C. and a relative humidity of 90% for 72 hours, the surface must cause no whitening phenomenon and all the surface resistance values measured at a plurality of positions must be a value in a range of $1 \times 10^8$ to $9 \times 10^{10} \Omega/\square$.

O: no whitening phenomenon and no surface resistance change are observed.

X: whitening phenomenon or surface resistance change is observed.

4. Measurement of Surface Resistance

Using a Hiresta IP MCP-HT260 instrument from MITSUBISHI CHEMICAL Co., the surface resistance of the films prepared in Examples and Comparative Examples was measured before and after the moist-heat resistant test.

Production Example 1. Synthesis of Salt (S1)

1 g of tungstosilicic acid hydrate as polyoxometalate was dissolved in 5 to 10 ml of methanol. Then, N-methacryloyloxyethyl-N,N,N-trimethylammonium chloride was dissolved in 5 to 10 ml of methanol, and then added to the above solution to perform ion exchange reaction.

Production Example 2. Synthesis of Salt (S2)

The reaction was performed in the same manner as in Production Example 1, except that N-octyl-N,N,N-trimethylammonium bromide was used instead of N-methacryloyloxyethyl-N,N,N-trimethylammonium chloride.

Production Example 3. Synthesis of Salt (S3)

The reaction was performed in the same manner as in Production Example 1, except that N,N,N-trioctyl-N-methylammonium chloride was used instead of N-methacryloyloxyethyl-N,N,N-trimethylammonium chloride.

Example 1

A mixture of 50 parts by weight of pentaerythritol triacrylate and 20 parts by weight of dipentaerythritol heptaacrylate, as multifunctional acrylate monomers, 5 parts by weight of Irgacure 184 as a photopolymerization initiator and 20 parts by weight of the salt (51) was diluted with an equal amount of ethanol to prepare a coating composition having a solid content of 40%. The coating composition was coated with a Meyer bar #10 on an electrode, and then subjected to curing with UV energy (mercury lamp) of 0.5 J/cm² at a rate of 4 m/min to produce a film having a thickness of 5 μm.

Example 2

A mixture of 50 parts by weight of pentaerythritol triacrylate and 30 parts by weight of dipentaerythritol heptaacrylate, as multifunctional acrylate monomers, 5 parts by weight of Irgacure 184 as a photopolymerization initiator and 10 parts by weight of the salt (S1) was diluted with an equal amount of ethanol to prepare a coating composition having a solid content of 40%. The coating composition was coated with a Meyer bar #10 on an electrode, and then subjected to curing with UV energy (mercury lamp) of 0.5 J/cm² at a rate of 4 m/min to produce a film having a thickness of 5 μm.

Comparative Example 1

A mixture of 40 parts by weight of pentaerythritol triacrylate and 40 parts by weight of dipentaerythritol heptaacrylate, as multifunctional acrylate monomers, 5 parts by weight of Irgacure 184 as a photopolymerization initiator and 10 parts by weight of DQ-100 from Kyoeisha Co., Ltd. as an amine-based monomer having a quaternary ammonium base was diluted with an equal amount of methyl ethyl ketone and propylene glycol methyl ether to prepare a coating composition having a solid content of 40%. The coating composition was coated with a Meyer bar #10 on an electrode, and then subjected to curing with UV energy (mercury lamp) of 0.5 J/cm² at a rate of 4 m/min to produce a film having a thickness of 5 μm.

Comparative Example 2

A mixture of 50 parts by weight of pentaerythritol triacrylate and 20 parts by weight of dipentaerythritol heptaacrylate, as multifunctional acrylate monomers, 5 parts by weight of Irgacure 184 as a photopolymerization initiator and 20 parts by weight of the salt (S2) was diluted with an equal amount of ethanol to prepare a coating composition having a solid content of 40%. The coating composition was coated with a Meyer bar #10 on an electrode, and then subjected to curing with UV energy (mercury lamp) of 0.5 J/cm² at a rate of 4 m/min to produce a film having a thickness of 5 μm.

Comparative Example 3

A mixture of 50 parts by weight of pentaerythritol triacrylate and 20 parts by weight of dipentaerythritol heptaacrylate, as multifunctional acrylate monomers, 5 parts by weight of Irgacure 184 as a photopolymerization initiator and 20 parts by weight of the salt (S3) was diluted with an equal amount of ethanol to prepare a coating composition having a solid content of 40%. The coating composition was coated with a Meyer bar #10 on an electrode, and then subjected to curing with UV energy (mercury lamp) of 0.5 J/cm² at a rate of 4 m/min to produce a film having a thickness of 5 μm.

The analysis results of the films of Examples and Comparative Examples are shown in Table 1 below.

TABLE 1

| | Transmittance (%) | Haze (%) | Surface resistance (Ω/□) | Moist-heat resistance test | Scratch resistant test |
|---|---|---|---|---|---|
| Example 1 | 92.5 | 0.3 | $10^9$-$10^{10}$ | ○ | ⊚ |
| Example 2 | 92.4 | 0.3 | more than $10^{11}$ | ○ | ⊚ |
| Comparative Example 1 | 92.5 | 0.3 | $10^9$-$10^{10}$ | X | X |
| Comparative Example 2 | 92.6 | 0.8 | $10^9$-$10^{10}$ | X | ○ |
| Comparative Example 3 | 92.3 | 1.0 | $10^9$-$10^{10}$ | X | △ |

From Table 1 above, it can be seen that Examples 1 and 2 exhibit excellent transmittance, haze and scratch resistance, whereas the whitening phenomenon has been not observed as a result of the moist-heat resistant test, and they exhibit the antistatic property to the same degree as in Comparative Example 1 comprising the conventional antistatic salt.

In the case of Comparative Examples 1 to 3, it can be seen that from the surface resistance values measured before the moist-heat resistant test, the antistatic property is good, but the haze characteristic or scratch resistance is lower than that of Examples. Also, in the case of Comparative Examples 1 to 3, the whitening phenomenon was observed after the moist-heat resistant test, and in particular, in the case of the surface resistance of Comparative Examples 1 to 3 measured after the moist-heat resistant test, the values varied greatly depending on the measured positions.

The invention claimed is:
1. A coating composition for an antistatic hard coating film, the coating composition comprising a salt having a polyoxometalate anion and a radically polymerizable cation; and a radically polymerizable binder,
   wherein the polyoxometalate anion contains molybdenum or tungsten, and
   wherein the radically polymerizable binder is a multifunctional acrylate containing two or more of the acryloyl group, methacrylolyl group, acryloyloxy group, methacryloyloxy group, acryloyloxyalkyl group or methacryloyloxyalkyl group.
2. The coating composition according to claim 1, wherein the polyoxometalate anion is an anion of a Lindqvist structure represented by Formula 1 below, an anion of an α-Keggin structure represented by Formula 2 below, an anion of an α-Wells-Dawson structure represented by Formula 3, an anion of a Preyssler structure represented by Formula 4 below, or an anion of an Anderson-Evans structure of Formula 5 below:

$$[(O)M_6O_{18}]^{2-}$$  [Formula 1]

wherein, M is molybdenum or tungsten, $$[(XO_4)M_{12}O_{36}]^{q-}$$  [Formula 2]

wherein, X is phosphorus, silicon or barium, M is molybdenum or tungsten, q is 3 when X is phosphorus, 4 when X is silicon, and 5 when X is barium, $$[(XO_4)_2M_{18}O_{54}]^{6-}$$  [Formula 3]

wherein, X is phosphorus and M is molybdenum or tungsten, $$[(XO_4)_5M_{30}O_{90}]^{15-}$$  [Formula 4]

wherein, X is phosphorus and M is molybdenum or tungsten,

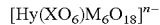 [Formula 5]

wherein, y is a number in a range of 0 to 6, n is a number in a range of 2 to 8, M is molybdenum or tungsten, and X is aluminum or tellurium.

3. The coating composition according to claim 1, wherein the radically polymerizable cation is represented by Formula 6 below:

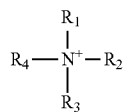 [Formula 6]

wherein, $R_1$ to $R_4$ are each independently hydrogen, an alkyl group, an alkoxy group, an alkenyl group, an alkynyl group, an acryloyl group, a methacryloyl group, an acryloyloxy group, a methacryloyloxy group, an acryloyloxyalkyl group or a methacryloyloxyalkyl group.

4. The coating composition according to claim 3, wherein at least one of $R_1$ to $R_4$ is an alkenyl group, an acryloyl group, a methacryloyl group, an acryloyloxy group, a methacryloyloxy group, an acryloyloxyalkyl group or a methacryloyloxyalkyl group.

5. The coating composition according to claim 1, wherein the salt is contained in a ratio of 15 to 60 parts by weight relative to 100 parts by weight of the radically polymerizable binder.

6. The coating composition according to claim 1, wherein the multifunctional acrylate is trifunctional or higher.

7. A film comprising a polymeric substance of a radically polymerizable binder and radically polymerizable cations, and polyoxometalate anions containing molybdenum or tungsten,
wherein the radically polymerizable binder is a multifunctional acrylate containing two or more of the acryloyl group, methacrylolyl group, acryloyloxy group, methacryloyloxy group, acryloyloxyalkyl group or methacryloyloxyalkyl group.

8. The film according to claim 7, wherein the film has a surface resistance in a range of $1 \times 10^8$ to $9 \times 10^{10} \Omega/\square$.

9. The film according to claim 7, wherein the film has a haze of 1% or less.

10. The film according to claim 7, wherein the film has a transmittance of 90% or more.

11. An optical laminate comprising the film of claim 7.

12. A display device comprising the optical laminate of claim 11.

* * * * *